Nov. 23, 1954　　　C. J. GREEN　　　2,694,881
GRINDING MACHINE
Filed Jan. 17, 1952　　　5 Sheets-Sheet 1
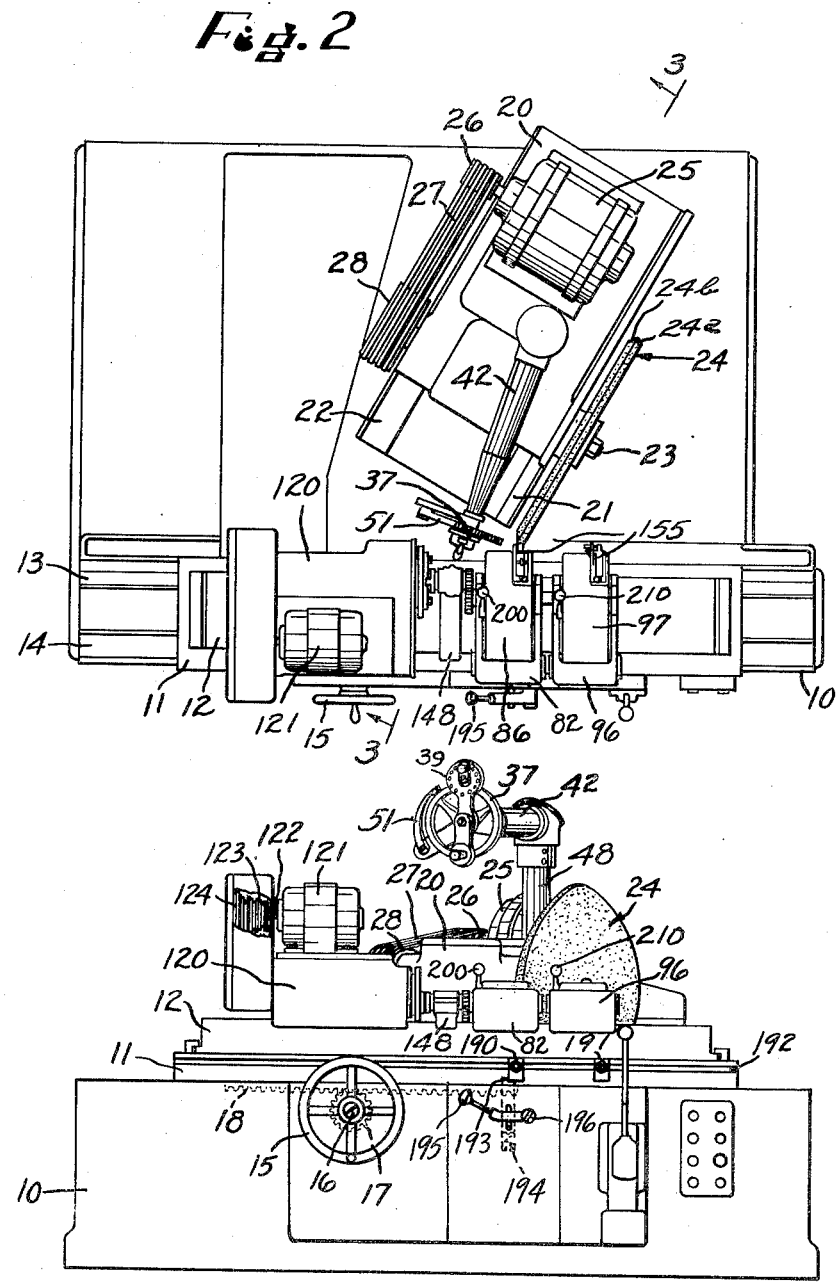
Inventor
CLARENCE J. GREEN
By Harold W. Eaton
Attorney

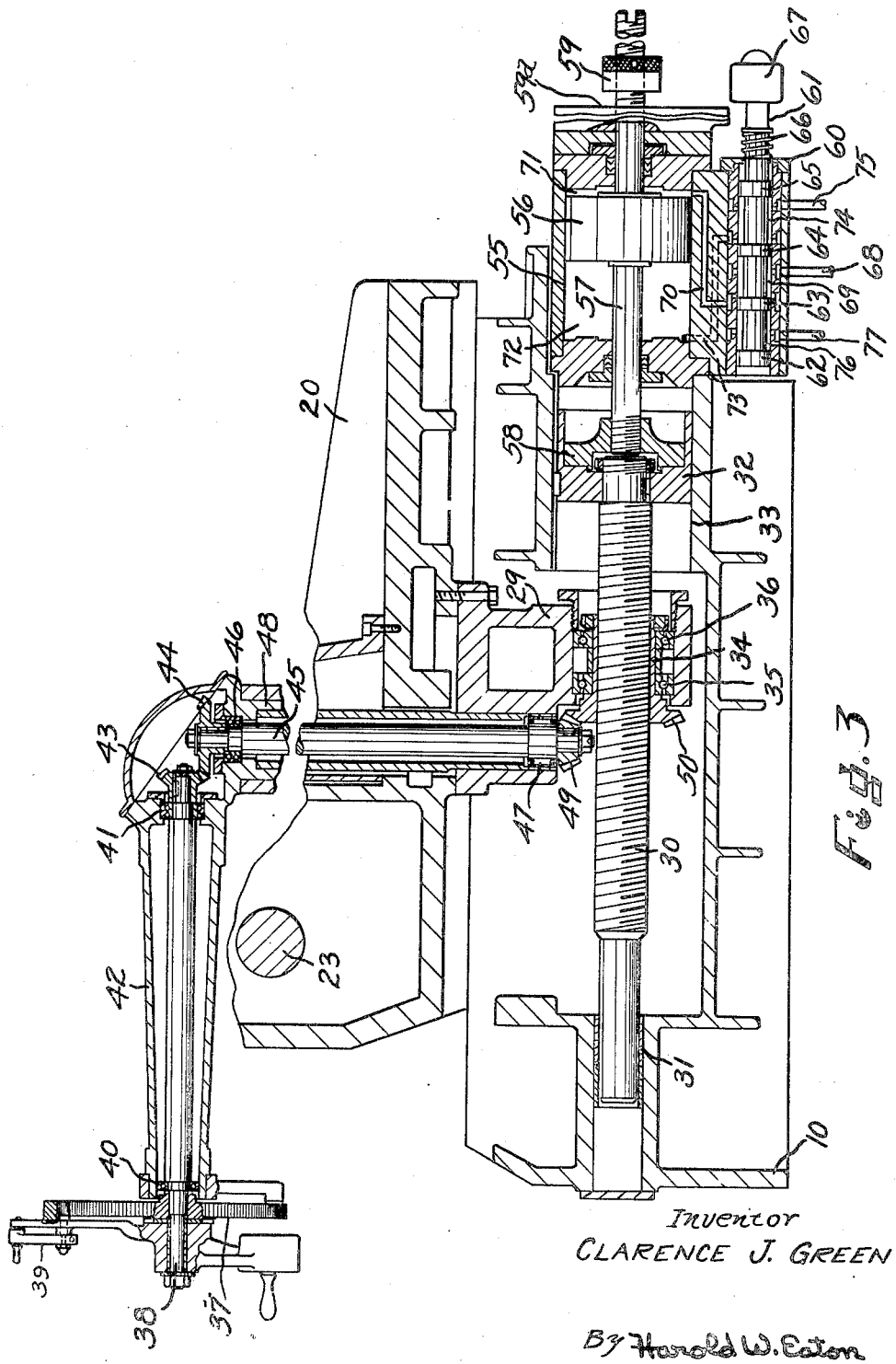

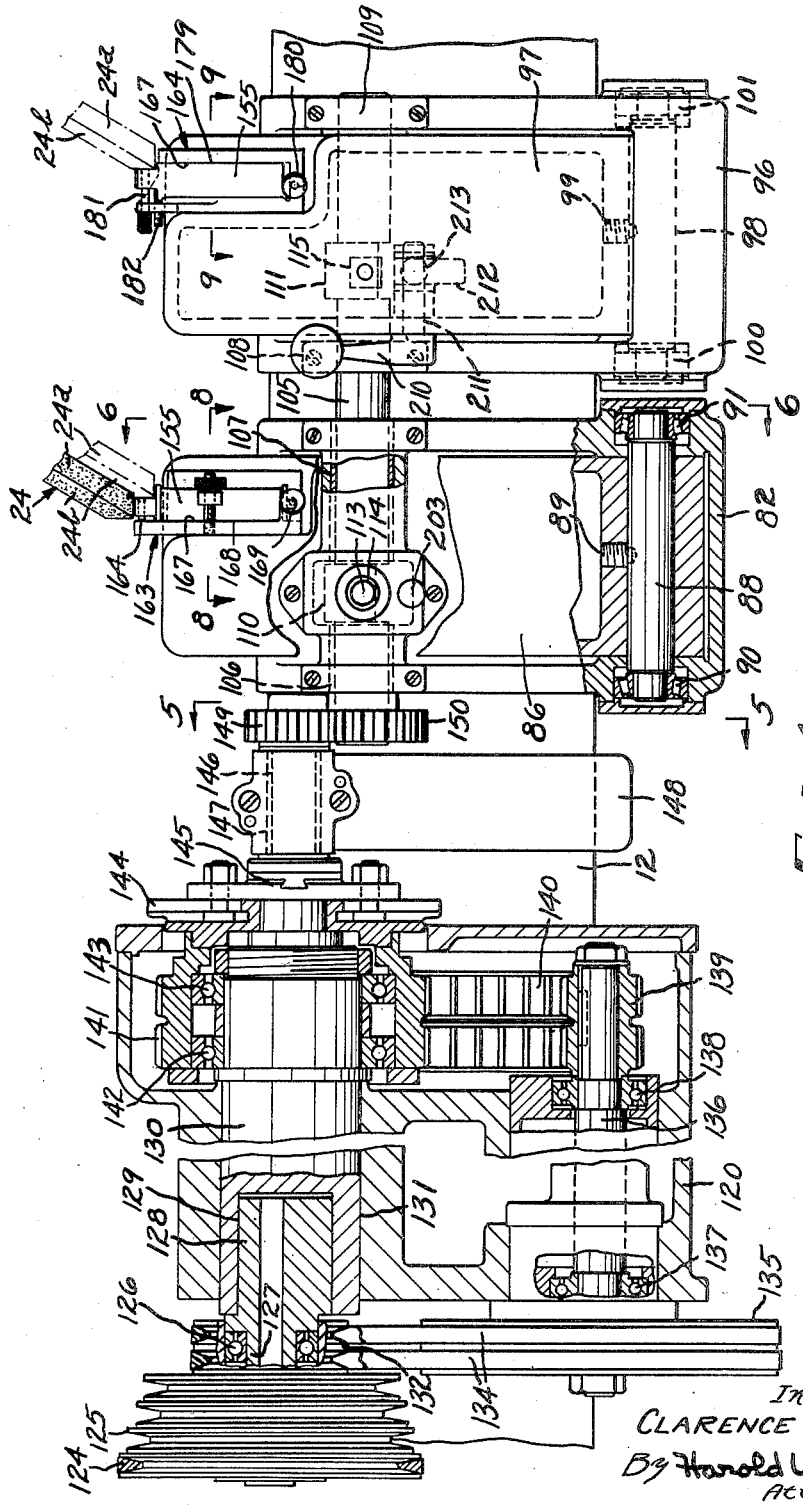

Inventor
CLARENCE J. GREEN
By Harold W. Eaton
Attorney

Nov. 23, 1954  C. J. GREEN  2,694,881
GRINDING MACHINE

Filed Jan. 17, 1952  5 Sheets-Sheet 5

Inventor
CLARENCE J. GREEN

By Harold W. Eaton
Attorney

United States Patent Office 2,694,881
Patented Nov. 23, 1954

2,694,881

GRINDING MACHINE

Clarence J. Green, Worcester, Mass., assignor to Norton Company, Worcester, Mass., a corporation of Massachusetts Application January 17, 1952, Serial No. 266,973

3 Claims. (Cl. 51—96)

The invention relates to grinding machines and more particularly to a grinding machine for grinding arcuate and shouldered surfaces on a work piece.

One object of the invention is to provide a simple and practical grinding machine for grinding arcuate and partial cylindrical surfaces in a work piece. Another object is to provide a pivotally mounted work holder for oscillating a work piece in engagement with a rotatable grinding wheel to facilitate grinding an arcuate and a shouldered surface on the end of a work piece. Another object is to provide an oscillatable work holder and a cam actuated mechanism for oscillating said holder to facilitate grinding a partial cylinder and an adjacent shoulder surface in a work piece. Another object is to provide a pair of spaced independently mounted oscillatable work holders and a rotatable cam shaft for a pair of spaced cams for oscillating said holders. Another object is to provide each of said holders with a manually operable mechanism whereby either one or both of said holders may be rendered inoperative, as desired. Other objects will be in part obvious or in part pointed out hereinafter.

The invention accordingly consists of the features of construction, and arrangement of parts, as will be exemplified in the structure to be hereinafter described, and the scope of this application of which will be indicated in the following claims.

In the accompanying drawings in which is shown one of the various possible embodiments of the mechanical features of this invention.

Fig. 1 is a fragmentary elevation of the improved grinding machine;

Fig. 2 is a plan view of the machine;

Fig. 3 is a cross sectional view, on an enlarged scale taken approximately on the line 3—3 of Fig. 2, through the wheel feeding mechanism;

Fig. 4 is a fragmentary plan view on an enlarged scale of the work supporting and driving mechanism partly in section to clarify the construction;

Figure 6:
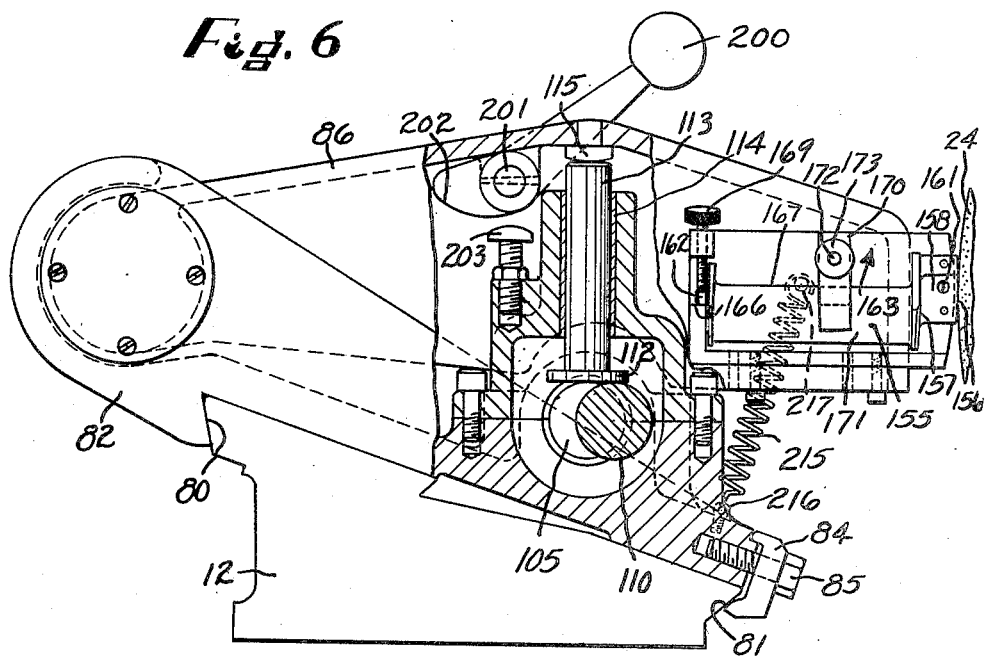
Fig. 6 is a fragmentary cross section view, taken approximately on the line 6—6 of Fig. 4, partly in elevation, showing the work support and actuating mechanism, therefor.

A grinding machine has been illustrated in the drawings comprising a base 10 which supports a longitudinal movable work supporting table 11. The table 11 serves as a support for a swivel table 12. The table 11 is arranged to slide longitudinally on a V-way 13 and a flat way 14 formed on the upper surface of the base 10. A traversing mechanism is provided for traversing the table 11 longitudinally relative to the base 10 to facilitate positioning a work piece to be ground into an operative position relative to the grinding wheel. The traversing mechanism may comprise a hand wheel 15 which is supported on the outer end of rotatable shaft 16. The inner end of the shaft 16 is provided with a gear 17 which meshes with a rack bar 18 depending from the under side of the table 11. It will be readily apparent from the foregoing disclosure that rotation of hand wheel 15 will be transmitted through the rack and gear mechanism to cause a longitudinal positioning movement of the table 11.

The base 10 also serves as a support for a transversely movable wheel slide 20 which is arranged to move transversely relative to the base 10 on a V-way 21 and a flat way 22 formed on the upper surface of the base 10. As illustrated in Fig. 2, the V-way 21 and the flat way 22 are angularly arranged so that the wheel slide 20 moves in a direction at an angle to a plane normal to the axis of the work piece to be ground in order to facilitate grinding not only on a partial cylindrical surface but also a shoulder surface adjacent thereto on the work piece being ground. The wheel slide 20 serves as a support for a rotatable grinding wheel spindle 23 which is journalled on suitable bearings (not shown). The wheel spindle 23 supports a grinding wheel 24 having a face 24a arranged to grind a cylindrical surface on the work piece being ground and a face 24b which is arranged to grind a shoulder face adjacent to the cylindrical surface on the work piece.

A suitable driving mechanism is provided for rotating the wheel spindle 23 and the grinding wheel 24 comprising a motor 25 mounted on the upper surface of the wheel slide 20. The motor 25 is provided with a multiple V-grooved pulley 26 which is connected by multiple V-belts 27 with a multiple V-grooved pulley 28 mounted on the other end of the wheel spindle 23.

A suitable feeding mechanism is provided for moving the wheel slide 20 transversely in either direction. This mechanism may comprise a non-rotatable feed screw 30 (Fig. 3) which is supported at its left hand end and in a bearing 31. The right hand end of the feed screw 30 is keyed within a slidably mounted sleeve 32. The sleeve 32 is slidably keyed within a cylindrical aperture 33. A feed nut 34 surrounds the feed screw 30 and meshes therewith. The nut 34 is rotatably supported in a pair of spaced antifriction bearings 35 and 36. The bearings 35 and 36 are fixedly mounted within a housing 29 depending from the under side of the wheel slide 20.

To facilitate a rotary motion of the nut 34 to cause a precise feeding movement of the wheel slide 20, a manually operatable wheel feed 37 is mounted on the left hand end of a rotatable shaft 38. A micrometer adjusting mechanism 39 is provided to precisely adjust the hand wheel relative to the shaft 38. The shaft 38 is rotatably supported in spaced bearings 40 and 41 which are fixedly mounted in a horizontally arranged housing 42. A bevel gear 43 is mounted on the right hand end of the shaft 38 and meshes with a bevel gear 44 which is keyed to the upper end of a vertically arranged shaft 45. The shaft 45 is journalled in spaced antifriction bearings 46 and 47 which are fixedly mounted within a vertical housing 48.

A bevel gear 49 is fixedly mounted on the lower end of the shaft 45 and meshes with a bevel gear 50 formed integrally with the nut 34. The housing 48 is arranged to support the horizontally extending housing 42. A pivotally mounted stop pawl 51 is arranged to engage a stop abutment (not shown) on the feed wheel 37 to limit the forward feeding movement of the wheel slide 20 and the grinding wheel 24. It will be readily apparent from the foregoing disclosures that a rotary motion of the feed wheel 37 will be transmitted to impart a rotary motion to the nut 34. Due to the fact that the feed screw 30 is held against rotation, a rotary motion of the feed nut 34 which is carried by the wheel slide 20, will be transmitted to impart a transverse feeding movement to the wheel slide 20 and to the grinding wheel 24.

It is desirable to provide means for rapidly moving the grinding wheel slide 20 and the grinding wheel 24 to and from an operative position. This is accomplished by means of a fluid motor comprising a cylinder 55 supported on the base 10 which contains a slidably mounted piston 56. The piston 56 is fixedly mounted on a piston rod 57, the left hand of which is fixedly connected to a flanged plate 58 carried by the sleeve 32. The right hand end of the piston rod 57 carries an adjustable stop 59 which is arranged to engage a stop surface 59a positively to limit the rapid positioning movement of the wheel slide 20.

A control valve 60 is provided for controlling the admission to and exhaust of fluid from the cylinder 55. The valve 60 is preferably a piston type valve having a valve stem 61 which is provided with a plurality of spaced integral valve pistons 62, 63, 64, and 65. A compression spring 66 surrounds a portion of the right hand end of the valve stem 61 and serves normally to maintain the valve stem 61 together with the valve pistons 62, 63, 64, and 65 in a right hand end portion. A solenoid 67 is provided which when energized serves to shift the valve stem towards the left into the position illustrated in Fig. 3.

Fluid under pressure from a suitable source, such as, from a fluid pump within the machine base 10 passes through a pipe 68 into a valve chamber 69 formed between the valve piston 63 and 64. In the position illustrated in Fig. 3, fluid entering a valve chamber 69 passes through a passage 70 into a cylindrical chamber 71 formed at the right hand end of the cylinder 55. Admission of fluid under pressure of the cylinder chamber 71 causes the piston 56 together with the wheel slide 20 to move toward the left (Fig. 3) to move the grinding wheel 24 into an operative position. During movement of the piston 56 toward the left, fluid within a cylindrical chamber 72 is exhausted through a passage 73 through a valve chamber 74 formed between the valve piston 64 and 65 and out through the exhaust pipe 75.

When the solenoid 67 is de-energized and the valve stem 61 is moved into a right hand end position by released compression of the spring 66. In this position of the valve stem 61, fluid under pressure entering the valve chamber 69 passes through the passage 73 into the cylindrical chamber 72 to move the piston 56 toward the right thereby moving the wheel slide 20 and the grinding wheel 24 rearwardly to in an operative position. During this movement of the piston 56 fluid within the cylindrical chamber 71 is exhausted through the passage 70 through the valve chamber 76 and out through the exhaust pipe 77.

The swivel table 12 serves as a support for a pair of spaced oscillatable work holders for supporting work pieces while grinding arcuate surfaces thereon. The upper portion of the swivel table 12 is provided with dovetail surfaces 80 and 81 which serve as a support for a work holder base 82. The base 82 is clamped in position on the swivel table 12 by means of a clamping block 84 and a clamping screw 85 (Fig. 6). The work holder base 82 serves as a support for a pivotally mounted frame 86. The frame 86 is provided with a rock shaft 88 which is fastened thereto by means of a set screw 89 (Fig. 4). The rock shaft 88 is supported by a pair of spaced anti-friction bearings 90 and 91 which are, in turn, fixedly supported on the work holder base 82.

The swivel table 12 supports a second work holder base 96 which is spaced from the work holder base 82. The base 96 is clamped on to the swivel table 12 in a manner similar to that as shown in connection with the base 82. The base 96 serves as a support for a pivotally mounted frame 97. The frame 97 supports a rock shaft 98 which is fixedly held thereon by means of a set screw 99. The rock shaft 98 is supported by a pair of spaced antifriction bearings 100 and 101 which are, in turn, fixedly supported on the base 16.

A suitable mechanism is provided for oscillating the frames 86 and 97. The mechanism may comprise a cam shaft 105 which is rotatably supported in spaced bearings 106 and 107 on the work holder base 82 and a pair of spaced bearings 108 and 109 on the work holder base 96. The cam shaft 105 is provided with a pair of spaced cams or eccentrics 110 and 111 (Fig. 4). The frame 86 is provided with a cam follower 112 which engages the cam 110. The follower 112 is formed integral with a vertically arranged plunger 113. The plunger 113 is slidably mounted on a bearing sleeve 114. The upper end of the plunger 113 bears against a follower stud 115 which is fixedly mounted on the frame 86. It will be readily apparent from the foregoing disclosures that a rotary motion of the cam shaft 105 will be transmitted through the cam 110 and the follower 112 to oscillate the frame 86 so as to impart the desired grinding action upon a work piece as will be hereinafter described.

A similar cam follower mechanism, including a cam follower 116 which engages the cam 111, is provided for oscillating the frame 97. This mechanism is identical with that just described for oscillating the frame 86, consequently, it has not been illustrated in detail.

Figure 5:
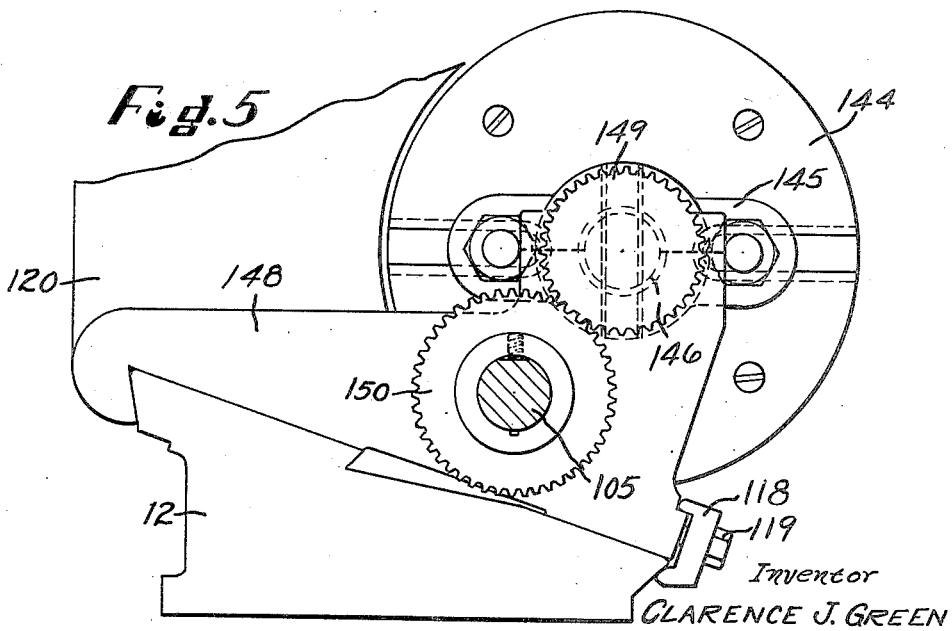
Fig. 5 is a cross section view, taken approximately on the line 5—5 of Fig. 4, showing the work driving mechanism.

The swivel table 11 also supports a work driving head 120. The work driving head 120 is provided with dovetail surfaces which mate with the dovetail surfaces 80 and 81 on the swivel table 12. The driving head 120 is clamped in a position on the swivel table 12 by means of clamping block 118 and a clamping screw 119 (Fig. 5). A motor 121 is mounted on the upper end surface of the head 120. The motor 121 is provided with a motor shaft 122 which carries a stepped V-groove pulley 123. The pulley 123 is connected by means of a V-belt 124 with a stepped V-groove pulley 125. The pulley 125 is supported by anti-friction bearings 126 in a rotatably adjustable sleeve 127. The sleeve 127 is formed integral with an eccentrically arranged sleeve 128 which is adjustably supported on a cylindrical aperture 129 formed within the left hand end of a work head spindle 130. The work head spindle 130 is non-rotatable and is supported within a cylindrical aperture 131 formed within the driving head 120. The eccentric sleeves 127—128 are provided to facilitate adjusting the tension of the driving belts.

A multiple V-groove pulley 132 is formed integral with the pulley 125 and is connected by multiple V-belts 134 with a multiple V-groove pulley 135. The pulley 135 is supported on the left hand end of a rotatable shaft 136 which is journalled on spaced bearings 137 and 138 fixedly mounted within the driving head 120. The shaft 136 supports sprocket 139 on its right hand end (Fig. 4) which is connected by a cog belt 140 with a sprocket 141. The sprocket 141 is supported by spaced anti-friction bearings 142 and 143 which are in turn supported on the spindle 130. A face plate 144 is fixedly connected to the sprocket 141 and is connected by means of a universal driving connection 145 with a rotatable shaft 146. The shaft 146 is journalled on a bearing 147 carried by a bracket 148 which is fixedly clamped on to the swivel table 12. The shaft 146 is provided with a gear 149 which meshes with a gear 150 mounted on the left hand end of the cam shaft 105. It will be readily apparent from the foregoing disclosures that rotation of the motor shaft 122 will be transmitted through the mechanism just described to rotate the cam shaft 105 thereby imparting on oscillating movement to the pivotally mounted frames 86 and 97.

Figure 10:
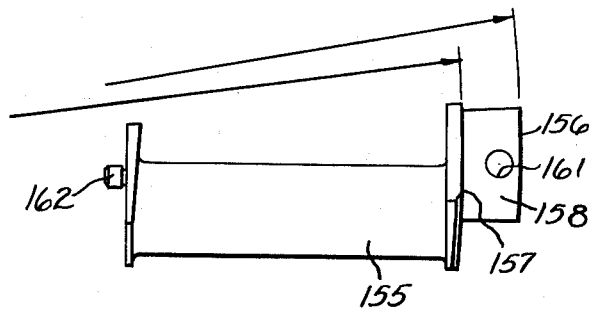
Fig. 10 is a fragmentary elevation, on an enlarged scale, of a work piece to be ground.
Figure 7:
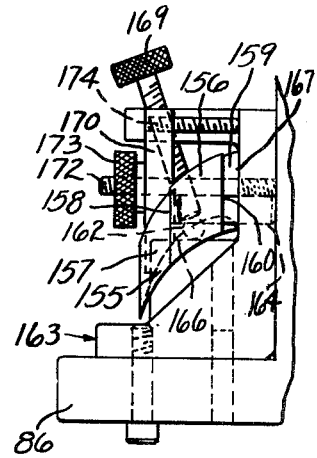
Fig. 7 is an end elevation, on an enlarged scale, of one of the work holders, showing a work piece clamped thereon.
Figure 9:
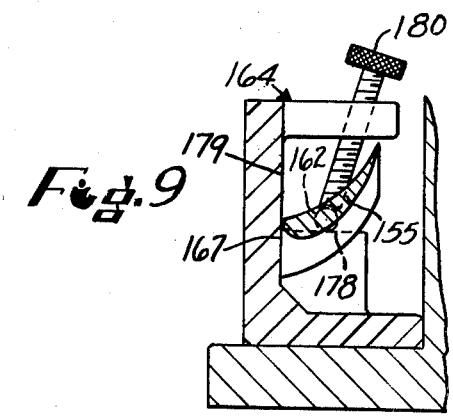
Fig. 9 is a cross sectional view, on an enlarged scale, taken approximately on the line 9—9 of Fig. 4, through the other work holder.
Figure 8:
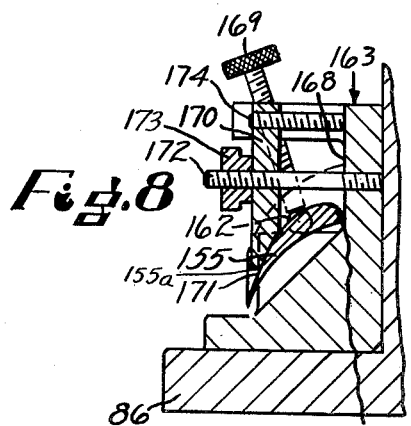
Fig. 8 is a cross sectional view, on an enlarged scale, taken approximately on the line 8—8 of Fig. 4, through one of the work holders.
Figure 11:
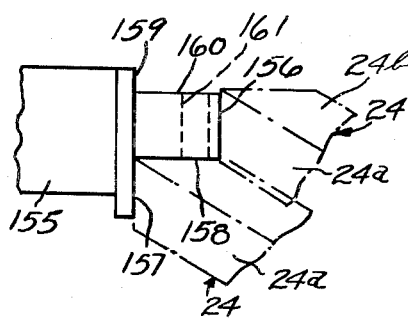
Fig. 11 is a fragmentary plan view, on an enlarged scale of a portion of the work piece.
Figure 12:
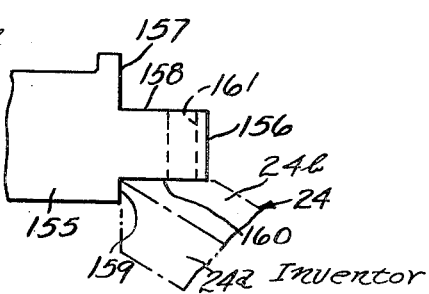
Fig. 12 is a similar fragmentary view, on an enlarged scale, with the work piece inverted for a second grinding operation.

This machine is particularly adapted for grinding arcuate partial cylindrical surfaces of a relatively long radius on a relatively small grinding machine. As illustrated the machine is arranged for grinding end surfaces on a jet motor blade, 155, such as, arcuate surfaces, 156, 157, and 159 and also shouldered surfaces 158 and 160 (Figs. 10, 11, and 12). The blade to be ground is provided with a hole 161 which is utilized for locating the blade on the machine and is also provided with a projecting boss 162 which is utilized to locate the blade in a grinding position. The pivotally mounted frames 86 and 97 are provided with work holders 163 and 164 respectively.

The blade to be ground is first positioned in the holder 163 with the boss 162 engaging a horizontal locating surface 166 in the workholder 163 and with the hole 161 on the locating stud 164 which is fixedly mounted on the workholder 163. A lead edge 167 of the blade 155 is located against a vertical locating surface 168 on holder 163. When the blade 155 is in this position, a clamp screw 169 supported by a projecting lug on the holder 163 is tightened to clamp the boss 162 in engagement with the locating surface 166. The holder 163 is also provided with a clamping block 170 which engages a convex surface 155a on the blade 155. The clamping block 170 is supported by a threaded stud 172 which is supported by the work holder 163. A knurled nut 173 is provided on the stud 172 to facilitate clamping the block against the convex surface 171 to hold the blade 155 with its leading edge 167 in position for a grinding operation. The upper end of the clamping block 170 is provided with an adjusting screw 174 which is screw threaded on to the clamping block 170 and bears against the vertical locating surface 168 to facilitate adjustment of the position of the clamping block 170. With the blade 155 located in this position, the arcuate surface 156 is first ground by the face 24a of the grinding wheel 24, after which the table 11 is traversed longitudinally into a predetermined position and the arcuate surface 157 and the adjustable shouldered surface 158 are then ground by the operative faces 24a and 24b of the grinding wheel 24 in a manner to be hereinafter described.

After these surfaces have been ground the blade 155 is removed from the holder 163 and inserted into the work holder 164 with the lead edge 167 of the blade 155 in engagement with a vertical locating surface 179 on the holder 164. The boss 162 is positioned in a horizontal locating surface 178 formed on the holder 164. A locating stud 181 is then slid into engagement with the locating hole 161 on the blade 155. With the blade in this position, a clamping screw 180 supported by a projecting lug on the holder 164 is tightened to clamp the boss 162 in position on the surface 178 and a clamping screw 182 on the holder 164 (Fig. 4) is tightened against the blade 155 so as to locate the blade 155 in position on the holder 164 for a grinding operation. With the blade in this position, the arcuate surface 159 and the adjacent shouldered surface 160 are ground in a manner to be hereinafter described.

In order to facilitate locating the work piece to be ground in a predetermined position relative to the grinding wheel 24, a pair of adjustable table dogs 190 and 191 are provided on the front edge of the table 11. The dogs 190 and 191 are supported by clamping bolts which slide within a T-slot 192 formed on the front edge of the work table 11. A vertically slidable table locating plunger 193 is supported by the base 10. The plunger 193 is normally urged in an upward direction by means of a compression spring 194 to maintain the plunger in an operative position. A manually operatable lever 195 is pivotally supported by a stud 196 on the front of the machine base 10 and serves to facilitate moving the plunger 193 downwardly to facilitate an indexing or positioning movement of the table 11.

By providing two spaced work holding units on the table 11, it is possible to grind one portion of a work piece 155 while the other work holding frame is in an inoperative position to facilitate a work loading operation. A cam operated mechanism is provided comprising a manually operable lever 200 which is mounted on a rock shaft 201 carried by the frame 86. The rock shaft 201 also supports a cam 202 which is arranged to be swung into engagement with an adjustably mounted stud 203 which is carried by the work holder base 82. It will be readily apparent from the above disclosure that when the lever 200 is swung in a counter-clockwise direction (Fig. 6), the cam 202 will move into engagement with the stud 203 and swing the frame 86 in a counter-clockwise direction to separate the cam follower 112 from the cam 110 and also to raise the work holder 163 upwardly to an inoperative position to facilitate a work loading operation.

An identical mechanism is provided for swinging the pivotally mounted frame 97 to an inoperative position, when desired. This mechanism may comprise a manually operable lever 210 which is supported by a rock shaft 211. The rock shaft 211 is rotatably journalled on the frame 97. The rock shaft 211 supports a cam 212 which is arranged to be moved into engagement with a stud 213 carried by the work holder base 96 (Fig. 4). It will be readily apparent from the foregoing disclosure that by manipulation of the lever 200 or the lever 210, the pivotally mounted frames 86 and 97 may be rendered operative or inoperative as desired.

A tension spring 215 (Fig. 6) is connected at one end to a stud 216 carried by the work holder base 82 and at the other end to a stud 217 carried by the pivotally mounted frame 86. The spring 215 is provided with sufficient tension to maintain the cam follower 112 in operative engagement with the cam 110 during rotation thereof. A similar spring is provided for maintaining the cam follower 116 in operative engagement with the cam 111. It will be readily apparent that when the cam shaft 105 is rotated the cam 110 will be rotated to impart an oscillating movement to the frame 86 to carry the work piece 155 in an arcuate path while in engagement with the grinding wheel 24 to grind the surface thereon at the desired and predetermined extent.

The operation of the improved grinding machine will be readily apparent from the foregoing disclosure. The blade 155 to be ground is placed in position, as above described, in the work holder 163 after which the hand wheel 15 is rotated while the lever 195 is depressed to position the table 11 as indicated in Figs. 1, 2, and 4. In this position of the table, the plunger 193 engages the lower surface of the dog 190. In this position of the parts, the work driving motor 121 is started to impart an oscillating movement of the frame 86 and the feed wheel 37 is rotated to feed the grinding wheel 24 forwardly to move the operative face 24a into operative engagement with the arcuate surface 156 to grind the same to the desired extent. After the surface 156 has been ground the table 11 is traversed longitudinally toward the left to position the blade 155, being ground, for grinding the arcuate surface 157 and the adjacent shoulder 158. In this position the dog 190 is positioned against the right hand side face of the plunger 193. When the table 11 is thus positioned, the feed wheel 37 may be rotated to advance the grinding wheel 24 so that the operative face 24a will move into grinding engagement with the arcuate face 157 and the operative face 24b will move into operative engagement with the shouldered face 158 simultaneously to grind the same to the desired extent.

After the faces 156, 157, and 158 on the blade 155 have been ground, the lever 200 is rocked in a counter-clockwise direction (Fig. 6) to rock the frame 86 in a counter-clockwise direction to an inoperative position. With the frame 86 in an inoperative position, the blade 155 is removed from the holder 163 and inserted in the work holder 164 in the frame 97. The blade 155 is rotated at 180° above its longitudinal axis so that when the blade is inserted in the holder 164, the lead edge 167 will engage the vertical locating surface 179 of the holder 164. With the blade 155 clamped in position as previously described, the lever 210 is rocked to release the compression of the spring 215 so that the frame 97 swings to a position so that the cam follower is in operative engagement with the cam 111. When the cam 111 is rotated, an oscillating motion will be imparted to the frame 97 to oscillate the blade 155 relative to the grinding wheel 24. The table 11 is then moved longitudinally toward the left until the dog 191 engages the right hand side face of the plunger 193. This indexing movement of the table 11 locates the blade 155 in position for grinding the arcuate surface 159 and the adjacent shoulder surface 160. When the blade is in this position, the feed wheel 37 may be rotated to advance the grinding wheel 24 so that the operative face 24a moves into grinding engagement with the arcuate face 159 and the operative face 24b moves into engagement with the shouldered face 160 simultaneously to grind the faces 159 and 160 to the desired and predetermined extent.

It will be readily apparent from the foregoing disclosure that while grinding the blade 155 supported by the frame 86, a blade previously ground thereon may be loaded into position onto the frame 97 so that it is ready for the next grinding operation. Similarly, while grinding the surface on the blade 155 supported on the frame 97, the frame 86 may be shifted to an inoperative position, in a manner above described, to facilitate the loading or unloading operation.

It will thus be seen that there has been provided by this invention apparatus in which the various objects hereinbefore set forth together with many thoroughly practical advantages are successfully achieved. As many possible embodiments may be made of the above invention and as many changes might be made in the embodiments above set forth, it is to be understood that all matter hereinabove set forth or shown in the accompanying drawings is to be interpreted as illustrative and not in a limiting sense.

I claim:

1. In a grinding machine having a base, a longitudinally movable work table thereon, means to traverse said table longitudinally, a transversely movable wheel slide on said base, a rotatable grinding wheel thereon, a feeding mechanism to feed said slide transversely either toward and from said table, a pair of spaced work holder bases adjustably clamped on said table, an oscillatable frame on each of said bases, a pivot shaft mounted on each of said bases pivotally to support one end of each of said frames, a work holder on the other end of each of said frames to support a work piece for a grinding operation, camshaft rotatably supported by each of said bases, a pair of spaced cams on said shaft, a follower on each of said frames which is operatively connected with said cams, driving means on said table to rotate said camshaft to impart an oscillating movement to said frames, and means including an independently manually operable lever-actuated cam on each of said frames to facilitate rendering either of said frames inoperative during a loading operation.

2. In a grinding machine, as claimed in claim 1, in combination with the parts and features therein specified of manually operable means to traverse said table longitudinally, and means including adjustable dogs on said table to facilitate locating the table in predetermined grinding positions.

3. In a grinding machine having a base, a longitudinally movable work table thereon, means to traverse said table longitudinally, a transversely movable wheel slide on said base, a rotatable grinding wheel thereon, a feeding mechanism to feed said slide transversely either toward or from said table, a work holder base adjustably clamped on said table, a horizontally-arranged oscillatable frame on said work holder base, a rock shaft interposed between the work holder base and one end of said frame for pivotally supporting one end of said frame, a work holder on the other end of said frame to support a work piece for grinding operation, a cam rotatably supported on said holder base, a follower on said frame between said rock shaft and said work holder which is operatively connected with said cam, driving means on said table to rotate said cam to impart an oscillating movement to the frame and work holder to facilitate grinding an arcuate surface on a work piece, and means including a manually operable lever-actuated cam on said frame to facilitate rocking said frame to an inoperative position during a loading operation.

References Cited in the file of this patent

UNITED STATES PATENTS

| Number | Name | Date |
|---|---|---|
| 1,023,513 | Gonard | Apr. 16, 1912 |
| 1,515,568 | Fleming et al. | Nov. 11, 1924 |
| 1,630,264 | Gunning | May 31, 1927 |
| 1,926,779 | Law | Sept. 12, 1933 |
| 2,037,796 | Johnston | Apr. 21, 1936 |
| 2,120,928 | Brump | June 14, 1938 |
| 2,179,213 | Green | Nov. 7, 1939 |
| 2,212,179 | Martin | Aug. 20, 1940 |
| 2,324,266 | Muskovin et al. | July 13, 1943 |
| 2,471,406 | Brinkman | May 31, 1949 |